(12) United States Patent
Hahm (10) Patent No.: US 6,311,202 B1
(45) Date of Patent: Oct. 30, 2001

(54) HARDWARE EFFICIENT FAST HADAMARD TRANSFORM ENGINE

(75) Inventor: Mark David Hahm, Flanders, NJ (US)

(73) Assignee: Lucent Technologies Inc., Murray Hill, NY (US)

( * ) Notice: Subject to any disclaimer, the term of this patent is extended or adjusted under 35 U.S.C. 154(b) by 0 days.

(21) Appl. No.: 09/267,451

(22) Filed: Mar. 12, 1999

(51) Int. Cl.[7] ................................................ G06F 17/14

(52) U.S. Cl. .................................................... 708/410

(58) Field of Search .................................... 708/410, 400

(56) References Cited

U.S. PATENT DOCUMENTS

| | | | |
|---|---|---|---|
| 3,701,143 | 10/1972 | Nacht | 340/347 DD |
| 3,795,864 | 3/1974 | Fullton, Jr. | 325/38 R |
| 3,859,515 | * 1/1975 | Radcliffe, Jr. | 708/410 |
| 4,621,337 | * 11/1986 | Cates et al. | 708/410 |
| 5,561,618 | * 10/1996 | Dehesh | 708/410 |
| 5,726,925 | * 3/1998 | Hyun et al. | 708/410 |
| 5,856,935 | * 1/1999 | Moy et al. | 708/410 |
| 6,028,889 | * 2/2000 | Gude et al. | 708/410 |

OTHER PUBLICATIONS

Rappaport, Theodore S., *Wireless Communications: Principles & Practices*, pp.528–531.

* cited by examiner

Primary Examiner—David H. Malzahn (57) ABSTRACT

A Fast Hadamard Transform apparatus having a plurality of transform stages, such as would be employed by a wireless telecommunication system for detecting and correcting errors that occur during the transmission of coded signal blocks, such as a Walsh codeword. Each stage of the apparatus comprises an adder and a subtractor, each having an output terminal. The adder and the subtractor are configured to receive signal pairs and generate intermediate coefficients. A first memory unit is coupled to the output terminal of the adder and to the output terminal of the subtractor, and is configured to receive a first specifiable sequence of the intermediate coefficients from the adder and a second specifiable sequence of the intermediate coefficients from the subtractor. A second memory unit is coupled to the output terminal of the subtractor so as to receive a third specifiable sequence of the intermediate coefficients from the subtractor. The first memory unit and the adder provide concurrently a plurality of intermediate coefficient signal pairs to a subsequent transform stage, and the first and second memory units provide concurrently a plurality of other intermediate coefficient signal pairs to the subsequent transform stage.

24 Claims, 9 Drawing Sheets

FIG. 3
STAGE 11

BUTTERFLY I/O   OPTION 1: OUTPUTS IN SEQUENTIAL ORDER

UPPER STAGE 0: 0 1 2 3 4 5 6 7 8 9 10 11 12 13 14 15 16 17 18 19 20 21 22 23 24 25 26 27 28 29 30 31 ...
LOWER STAGE 0: 32 33 34 35 36 37 38 39 40 41 42 43 44 45 46 47 48 49 50 51 52 53 54 55 56 57 58 59 60 61 62 63 ...

UPPER STAGE 1: 0 1 2 3 4 5 6 7 8 9 10 11 12 13 14 15 ...
LOWER STAGE 1: 16 17 18 19 20 21 22 23 24 25 26 27 28 29 30 31 ...

UPPER STAGE 2: 0 1 2 3 4 5 6 7 ...
LOWER STAGE 2: 8 9 10 11 12 13 14 15 ...

UPPER STAGE 3: 0 1 2 3 ...
LOWER STAGE 3: 4 5 6 7 ...

UPPER STAGE 4: 0 1 ...
LOWER STAGE 4: 2 3 ...

UPPER STAGE 5: 0 ...
LOWER STAGE 5: 1 ...

HARDWARE EFFICIENT FAST HADAMARD TRANSFORM ENGINE

FIELD OF THE INVENTION

This invention relates generally to wireless communications, and more particularly to a Fast Hadamard Transform arrangement that is employed to detect and correct errors occurring during the transmission of Walsh codewords.

BACKGROUND OF THE INVENTION

Figure 1:
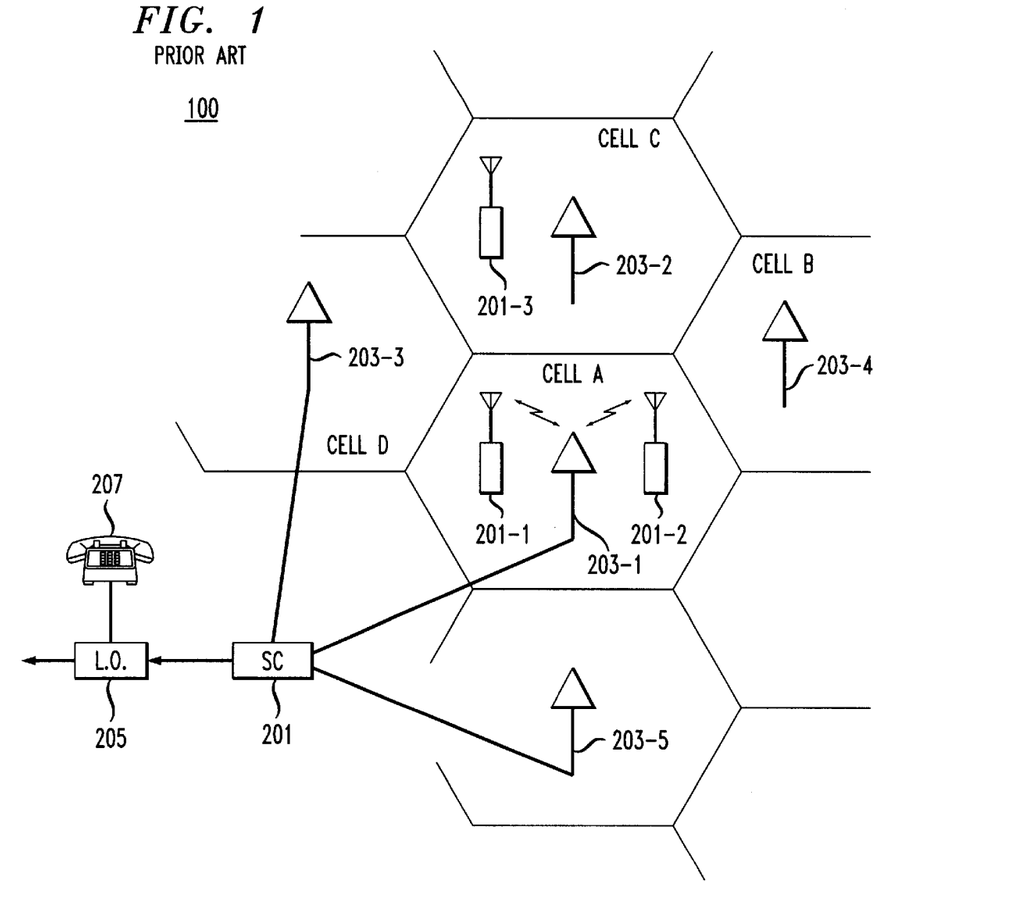
FIG. 1 illustrates a typical wireless telecommunications system, in accordance with one embodiment of the present invention.

FIG. 1 illustrates a typical wireless telecommunications system. Switching center 201 is connected to a plurality of base stations, such as those depicted by base stations 203-1 through 203-5. Additionally, switching center 201 is connected to local or long-distance telephone offices (not shown). Wireless terminals, such as those depicted by terminals 201-1 through 201-3, communicate with a base station which is located in the same pre-determined geographic area, or cell, as itself. For instance, wireless terminals 201-1 and 201-2 are located in cell A, therefore communicate with base station 203-1, which is located in and services cell A.

In order for wireless terminal 201-1 to communicate, it sends a signal via radio waves to base station 203-1; base station 203-1 relays the received signal to switching center 201; and, switching center 201, according to instructions supplied as part of the signal, relays the signal elsewhere. If the desired destination of the signal is another wireless terminal, then switching center 201 relays the signal to a base station located in the same cell as the wireless terminal intended to receive the signal, and the base station transmits the signal via radio waves to the wireless terminal. Likewise, if the desired destination of the signal is a wireline terminal, such as wireline terminal 207, then switching center 201 relays the signal to the desired destination via wirelines to the local or long-distance networks.

Figure 2:
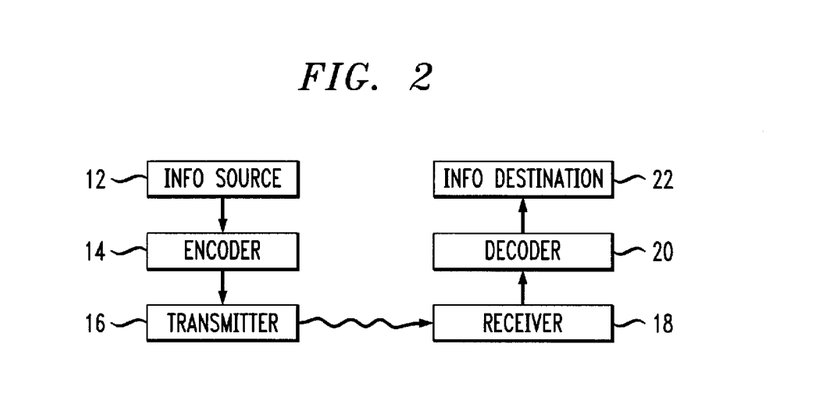
FIG. 2 illustrates some of the components which are typically employed by a digital wireless telecommunications channel in order to detect and correct transmission errors, in one embodiment of the present invention.

When information is transmitted via a digital wireless telecommunications channel, errors can occur in the transmission due to noise, interference and distortion. Various methods are utilized in order to detect and correct errors that occur during transmission. FIG. 2 illustrates some of the components which are typically employed by a digital wireless telecommunications channel in order to detect and correct transmission errors. Information source 12 sends a digital message to encoder 14. The digital message can consist of digitized voice signals, data, etc. Encoder 14 encodes the digital message and feeds it to transmitter 16, which modulates the encoded message onto a carrier and transmits it via radio waves to receiver 18. Receiver 18 receives the message, which may or may not have been corrupted during transmission. Receiver 18 demodulates the received message and feeds it to decoder 20. Decoder 20 decodes the received message and feeds it to information destination 22. Preferably, the digital message fed to information destination 22 is identical to the original digital message which was sent by information source 12.

In order for information destination 22 to receive the same message that was sent by information source 12, encoder 14 and decoder 20 operate to detect and correct errors due to corruption during transmission. Generally, encoder 14 partitions the digital message signal into fixed-length blocks and replaces each block with a codeword uniquely associated with it. The codeword is transmitted instead of the fixed-length block, and the received message is compared to a known set of legitimate codewords in order to determine whether it was corrupted during transmission. One such error detection/correction scheme involves the generation and transmission of Walsh codes.

According to the Walsh code system, encoder 14 partitions a message from information source 12 into blocks having n bits each. Each of the original n-bit blocks of information to be transmitted is converted into a codeword, unique to the block of information, having $2^n$ Walsh chips. Thus, a 3-bit block of data would have a Walsh codeword with $2^3$, or 8, Walsh chips. Instead of modulating and transmitting the original 3-bit block of data, transmitter 16 modulates and transmits the Walsh codeword to receiver 18. When the Walsh codeword is received by receiver 18, it is demodulated and fed to decoder 20. Decoder 20 compares the received Walsh codeword, which has potentially been corrupted during transmission, to a set of legitimate Walsh codewords. If the received Walsh codeword matches one of the codewords in the set of legitimate Walsh codewords, then it is presumed that the received codeword was not corrupted during transmission, and can be decoded back into the 3-bit block of information which was originally intended to be transmitted.

If, however, the received Walsh codeword does not match one of the codewords in the set of legitimate Walsh codewords, then the received codeword was corrupted during transmission, and the receiver must determine which of the legitimate Walsh codewords was originally transmitted. In the prior art, a Fast Hadamard Transform (hereinafter "FHT") algorithm is used to calculate, for each received codeword, the likelihood that a received codeword is a particular legitimate Walsh codeword. The FHT algorithm expresses this likelihood as a correlation coefficient. Thus, a received codeword has $2^n$ correlation coefficients associated with it, one corresponding to each of the $2^n$ legitimate Walsh codewords. The legitimate Walsh codeword having the largest correlation coefficient is the legitimate codeword most likely to have been transmitted. Thus, the FHT algorithm assigns to a received codeword the legitimate Walsh codeword having the largest correlation coefficient. The "winning" Walsh codeword is then decoded back into a 3-bit block of information and fed to information destination 206.

Although many techniques for implementing Fast Hadamard Transforms are well-known in the prior art, these techniques are generally too slow and require too much hardware.

Thus, there exists a need for an FHT engine that is fast, compact and efficient.

SUMMARY OF THE INVENTION

The present invention, in accordance with one embodiment, is a Fast Hadamard Transform apparatus. The FHT apparatus is employed by a wireless telecommunication system for detecting and correcting errors that occur during the transmission of signal blocks, in accordance with the FHT algorithm. The FHT apparatus of the present invention requires a smaller amount of hardware and memory compared to prior art systems to store signals while performing the sum and difference operations required by the FHT algorithm.

According to one embodiment, the wireless communication system employs the FHT apparatus to receive signal blocks that have been encoded according to, for example, Walsh codewords. Preferably, correlation coefficients are generated by the FHT apparatus corresponding to legitimate codewords that may have been transmitted. For instance, an n-bit block of data desired to be transmitted via a wireless telecommunication channel is converted into a $2^n$-chip Walsh codeword prior to transmission. The $2^n$-chip Walsh codeword is transmitted instead of the n-bit block of data, and is received as chip pairs by a first transform stage of the FHT apparatus.

Advantageously, the FHT apparatus comprises a plurality of transform stages. Each transform stage of the apparatus performs a series of operations on the input signals that it receives. Each subsequent transform stage receives input signals from the stage preceding it in a number of clock cycles which is one half the number of clock cycles which the preceding stage received its input signals. Preferably, this is accomplished by progressively decreasing the memory storage capacity of first, second and third memory units (explained further below) employed in each stage by a factor of two.

Each stage of the apparatus comprises an adder and a subtractor. The adder and the subtractor receive input signal pairs within each received signal block (i.e.—one input signal is received by the adder and the other is received by the subtractor) so as to generate intermediate coefficients.

In each transform stage, a first memory unit is coupled to an output terminal of the adder and to an output terminal of the subtractor, and receives a first specifiable sequence of the intermediate coefficients from the adder and a second specifiable sequence of the intermediate coefficients from the subtractor. A second memory unit is coupled to an output terminal of the subtractor so as to receive a third specifiable sequence of the intermediate coefficients from the subtractor. The first memory unit and the adder provide concurrently a plurality of intermediate coefficient signal pairs to a subsequent transform stage, and the first and second memory units provide concurrently a plurality of other intermediate coefficient signal pairs to the subsequent transform stage.

In another embodiment of the invention, the FHT apparatus also comprises a clock means, such as an N-bit counter, for causing successive pairs of input signals to be received by the FHT apparatus. The clock means determines the time interval at which each successive pair of input signals is received by the FHT apparatus. The counter signal received by each of the transform stages alternately enables and disables the second memory unit, and determines which of the first or second specifiable sequences of intermediate coefficients is received by the first memory unit.

In still another embodiment of the invention, each signal generated by a final transform stage is a correlation coefficient that corresponds to one of N legitimate coded signal blocks, and the signal having the largest value corresponds to the coded signal block that was most likely to have been transmitted by the wireless system. Therefore, the coded signal block that is the most likely to have been transmitted is decoded by the communication system and is delivered to the intended recipient.

BRIEF DESCRIPTION OF THE DRAWINGS

The present invention will be further understood from the following description with reference to the accompanying drawings, in which.

DETAILED DESCRIPTION OF THE INVENTION

The present invention, in accordance with one embodiment, is employed by a digital wireless telecommunications system in order to detect and correct errors that occur during the transmission of a message due to noise, interference and distortion, although the invention is not limited in scope in this respect. FIG. 2 illustrates a wireless telecommunications channel and some of the components which are employed by one embodiment of the present invention in order to detect and correct transmission errors. Information source 12 sends a digital message to encoder 14, which encodes the digital message by converting it into a Walsh codeword. Encoder 14 then feeds the Walsh codeword to transmitter 16, which modulates the codeword onto a carrier and transmits it via radio waves to receiver 18. Receiver 18 receives and demodulates the received Walsh codeword and feeds it to decoder 20. Because of transmission errors, the received Walsh codeword may be corrupted. Decoder 20 employs the FHT engine of the present invention to generate correlation coefficients in order to determine which of the legitimate Walsh codewords was the most likely to have been sent. Decoder 20 then converts the resulting legitimate Walsh codeword back into the original digital message and feeds it to information destination 22. Preferably, the digital message fed to information destination 22 is identical to the original digital message which was sent by information source 12.

Figure 3:
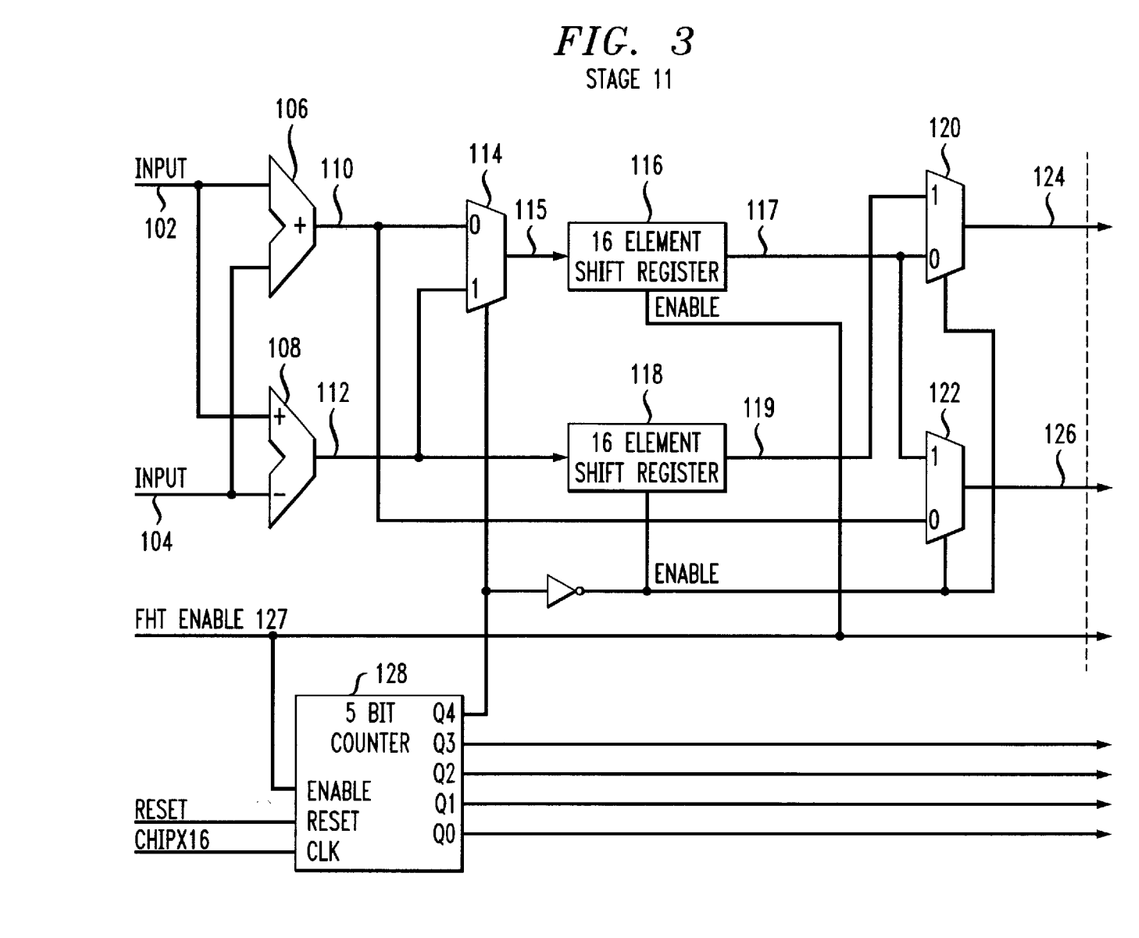
FIG. 3 illustrates the components of each stage of an FHT engine, in accordance with one embodiment of the present invention.

FIG. 3 illustrates the components of a typical stage as employed by an FHT engine, in accordance with one embodiment of the present invention. Stage 10 has an upper input terminal 102 and a lower input terminal 104. Upper input terminal 102 is configured to receive a plurality of input signals, which are either Walsh chips (if the stage is the first stage of the FHT engine) or intermediate correlation coefficients (if the stage is not the first stage of the FHT engine). If a block of N Walsh chips is to be processed, then upper input terminal 102 receives N/2 input signal bits or symbols. Upper input terminal 102 is coupled to a first input terminal of adder 106, and is further coupled to a first input terminal of subtractor 108. Similarly, lower input terminal 104 is configured to receive a plurality of input signals, which are either Walsh chips (if the stage is the first stage of the FHT engine) or intermediate correlation coefficients (if the stage is not the first stage of the FHT engine). Similar to terminal 102, if a block of N Walsh chips is to be processed, then lower input terminal 104 receives N/2 input signal bits or symbols. Lower input terminal 104 is coupled to a second input terminal of adder 106, and is further coupled to a second input terminal of subtractor 108. As will be discussed more fully later, a pair of Walsh chips or intermediate correlation coefficients may arrive at upper and lower input terminals 102 and 104 in various different orders.

Adder 106 is configured to generate output signal 110 by summing the pair of input signals received by upper input terminal 102 and lower input terminal 104. Output signal 110 generated by adder 106 is sent to a first input terminal, designated as input terminal "0", of multiplexer 114 and a second input terminal, designated as input terminal "0", of multiplexer 122. Subtractor 108 is configured to generate output signal 112 by subtracting the same pair of input signals received by upper input terminal 102 and lower input terminal 104. Output signal 112 generated by subtractor 108 is sent to a second input terminal, designated as input terminal "1", of multiplexer 114 and to an input of shift register 118. Multiplexer 114 is configured to generate an output signal 115, which is sent to an input terminal of shift register 116.

Shift registers 116 and 118 are memory spaces. The number of signals that can be stored in shift registers 116 and 118 depend on how many stages are in the FHT engine and on which stage of the FHT engine they are located in, as will be explained below. Shift register 116 is configured to generate an output signal 117, which is sent to a second input terminal, designated as input terminal "0", of multiplexer 120 and to a first input terminal, designated as input terminal "1", of multiplexer 122. Shift register 118 is configured to generate an output signal 119, which is sent to a first input terminal, designated as input terminal "1", of multiplexer 120.

Multiplexer 120 is configured to generate an output signal 124, which corresponds to an input signal received by upper input terminal 102 of the next stage of said engine, provided that the current stage is not the last stage of the FHT engine. If the current stage is not the last stage of the FHT engine, then output signal 124 and the corresponding input signal of the next stage is referred to as an intermediate correlation coefficient. If the current stage is the last stage of the FHT engine, then output signal 124 corresponds to a final correlation coefficient, the value of which is utilized by the FHT engine to determine the legitimate Walsh codeword most likely to have been transmitted.

Multiplexer 122 is configured to generate an output signal 126, which corresponds to an input signal to be received by lower input terminal 104 of the next stage of the FHT engine, provided that the current stage is not the last stage of the FHT engine. As above, if the current stage is the last stage of the FHT engine, then output signal 126 and the corresponding input signal of the next stage are referred to as an intermediate correlation coefficient. If the current stage is the last stage of the FHT engine, then output signal 126 corresponds to a final correlation coefficient, the value of which is utilized by the FHT engine to determine the legitimate Walsh codeword most likely to have been transmitted.

FHT Enable signal 127 is coupled to shift register 116 so as to enable shift register 116 at all times. FHT Enable signal 127 is also coupled to clock means 128. In this embodiment, clock means 128 is a 5-bit counter. Each bit of the counter is represented in FIG. 3 by output terminals $Q_0$ through $Q_4$, and each clock cycle corresponds to the 5-bit counter counting one value higher. Output terminal $Q_0$ is the first bit of the counter and is alternately turned "on" and "off" at each clock cycle (i.e.—00000, 00001, etc.), while $Q_1$ is the second bit of the counter and, as the 5-bit counter counts successively higher, is alternately "on" for two cycles and then "off" for two cycles (i.e.—00000, 00001, 00010, 00011, etc.). $Q_2$ is the third bit of the counter and is alternately "on" for four cycles then "off" for four cycles, while $Q_3$ is the fourth bit of the counter and is alternately "on" for eight cycles then "off" for eight cycles, respectively. FIG. 5, which will be explained in greater detail below, illustrates that output terminals $Q_0$ through $Q_3$ are each coupled to one of the shift registers and to the multiplexers of subsequent Stage 1 through Stage 4, respectively.

In the embodiment shown in FIG. 3, output terminal $Q_4$ is the fifth bit of the counter and is alternately "on" for sixteen-cycles and then "off" for sixteen cycles (i.e.—00000 . . . 01111, 10000 . . . 11111, etc.). Output terminal $Q_4$ is coupled to shift register 118 and thus causes shift register 118 to alternately be enabled for sixteen cycles and then disabled for sixteen cycles. Generally, at each clock cycle, signals stored in shift registers 116 and 118 are shifted one position in the shift registers' internal memory spaces. After all of the internal memory spaces have been filled, the arrival of another input signal will cause the shift registers to generate an output signal corresponding to the first signal which it received. Each subsequent arrival of an input signal will further cause the shift registers to generate additional output signals corresponding to the second input signals received, the third input signal received, etc. Output terminal $Q_4$ is also coupled to multiplexers 114, 120 and 122, and causes the multiplexers to alternately select an input signal on their upper input terminal for sixteen cycles, and then select an input signal on their lower input terminal for sixteen cycles.

It should be noted that the number of bits of the counter as employed by clock means 128 depends upon the number of Walsh chips being processed by the Fast Hadamard Transform engine. If N Walsh chips are to be processed by the engine, then clock means 128 employs a counter having $\log_2(N/2)$ bits. Thus, a 32-ary orthogonal modulator, which processes blocks or codewords having 32 Walsh chips, employs a 4-bit counter, while a 128-ary orthogonal modulator, which processes blocks or codewords having 128 Walsh chips, employs a 6-bit counter. Regardless of the size of the counter, each bit of the counter is coupled to a successive stage of the engine.

The number of stages for the engine also depends on the number of Walsh chips being processed by the FHT engine. The number of stages for the FHT engine is equal to $\log_2 N$, wherein N is the number of Walsh chips in a transmitted block or Walsh codeword. For instance, a 64-ary orthogonal modulator, which processes blocks or codewords having 64 Walsh chips, has $\log_2(64)$, or 6, stages, while a 32-ary orthogonal modulator has $\log_2(32)$, or 5, stages.

Figure 4:
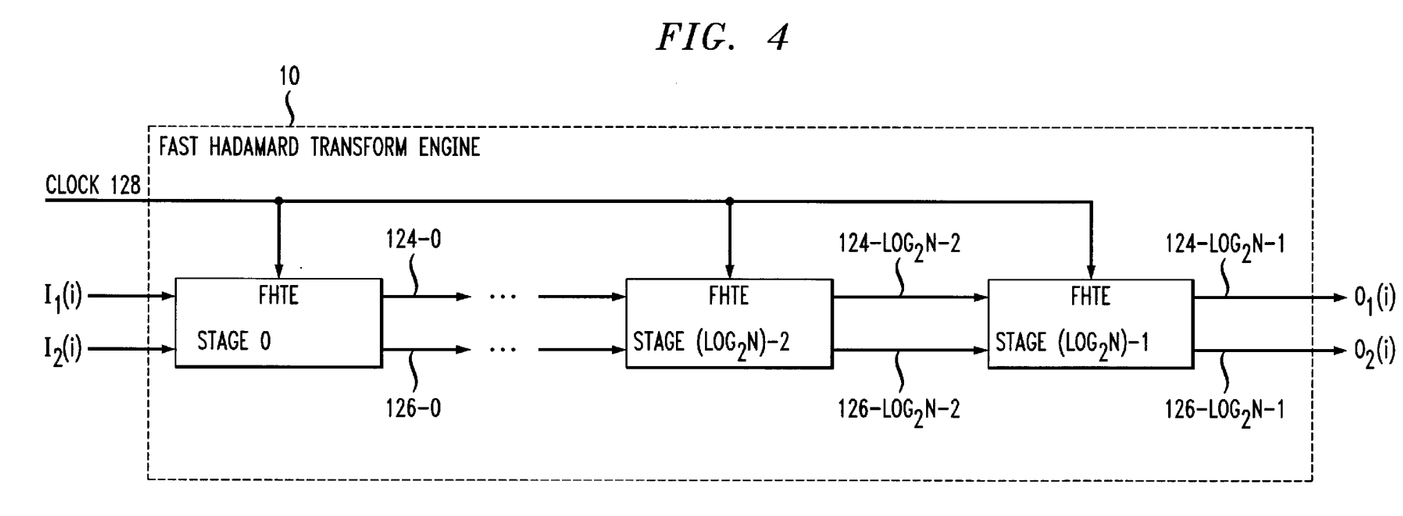
FIG. 4 illustrates how a plurality of stages of the FHT engine are connected, in accordance with one embodiment of the present invention.

The stages of an FHT engine are connected in cascading fashion, such that the output signals from one stage correspond to the input signals for a subsequent stage. FIG. 4 illustrates, in accordance with one embodiment of the invention, how various stages are connected. In FIG. 4, $I_1(i)$ and $I_2(i)$ are Walsh chips that are inputted into Fast Hadamard Transform engine 10. As shown, the Walsh chips enter Stage 0, which generates output signals 124-0 and 126-0 corresponding to intermediate correlation coefficients. Output signals 124-0 and 126-0 from Stage 0 are the input signals for the next stage and the output signals of that next stage, for instance output signals 124-$\log_2 N$-2 and 126-$\log_2 N$-2, are the input signals for the next consecutive stage. This repeats until finally a pair of signals are inputted into Stage $(\log_2(N-1))$. In the embodiment shown, stage $(\log_2$ (N−1)) is the final stage of the FHT engine, and it generates output signals 124-$\log_2 N-1$ and 126-$\log_2 N-1$, corresponding to the final correlation coefficients used to determine which Walsh codeword was the most likely to have been sent. FIG. 5, which will be explained more fully below, shows in detail how stages "0" through "5" are connected for a 64-ary bit system.

The number of signals, or Intermediate Walsh coefficients, that can be stored in shift registers 116 and 118, as mentioned previously, is determined by the number of stages in the FHT engine and by which stage the shift register is located. In an FHT engine which processes Walsh codewords having N Walsh chips, the number of signals or chips which can be stored in the s stage of the shift registers corresponds to $(N/4)/2^s$. Thus, for a system processing Walsh codewords having 64 Walsh chips, the number of chips which can be stored in the shift registers of the first stage (stage "0") is equal to $(64/4)/2^s=16/2^0=16$. For the same system, the number of chips which can be stored in the shift registers of the second stage (stage "1") is equal to $(64/4)2^1=8$. The number of chips which can be stored in the shift registers of Stages 2, 3 and 4 of this system is 4, 2 and 1 chips, respectively. For a system processing Walsh codewords having 32 Walsh chips, the number of chips which can be stored in the shift registers of Stage 0 is 8, while in Stage 1 is 4, etc.

Figure 5A:
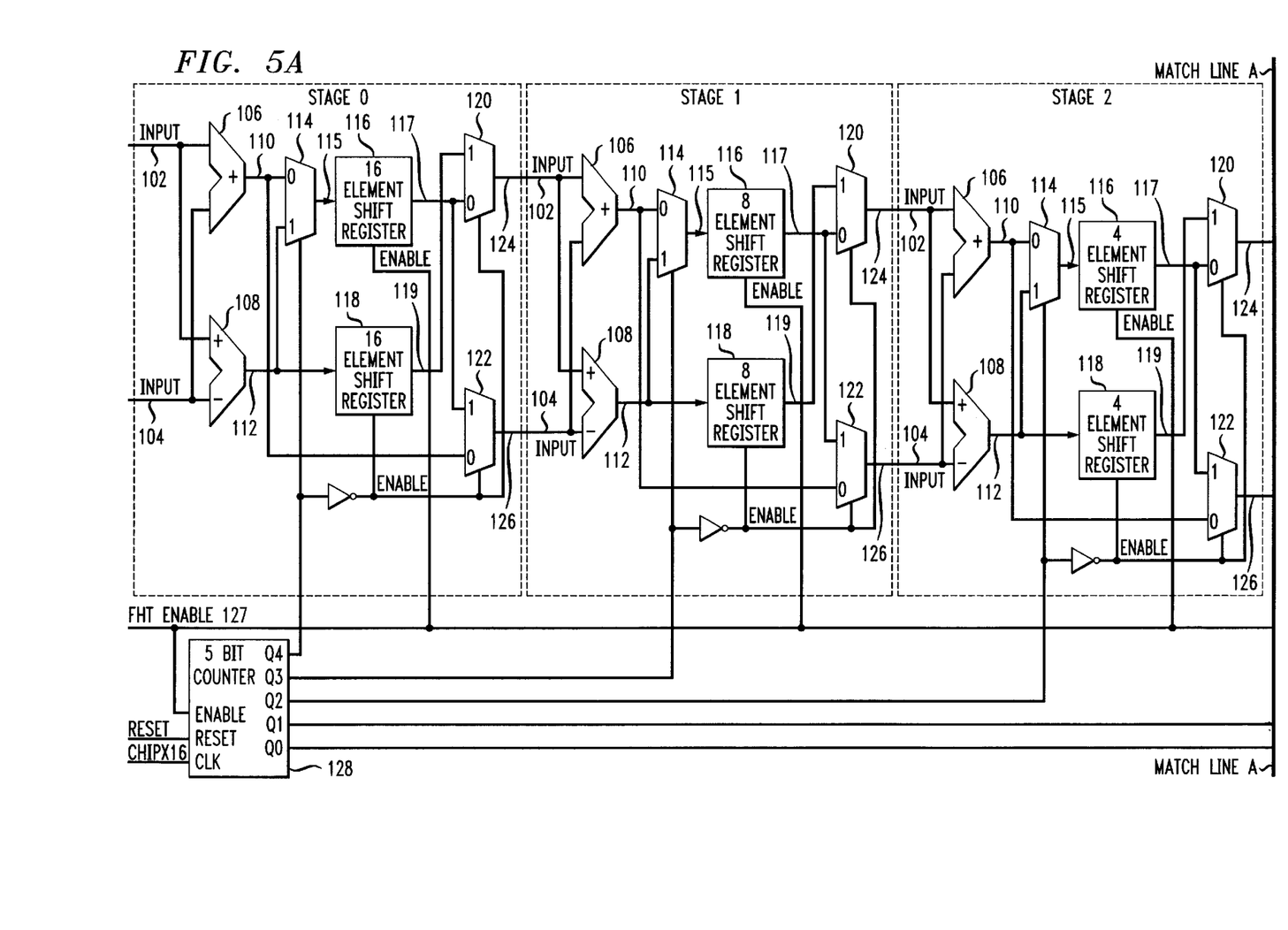
FIGS. 5A–B illustrates an FHT engine having a plurality of stages, in accordance with one embodiment of the present invention.
Figure 5B:
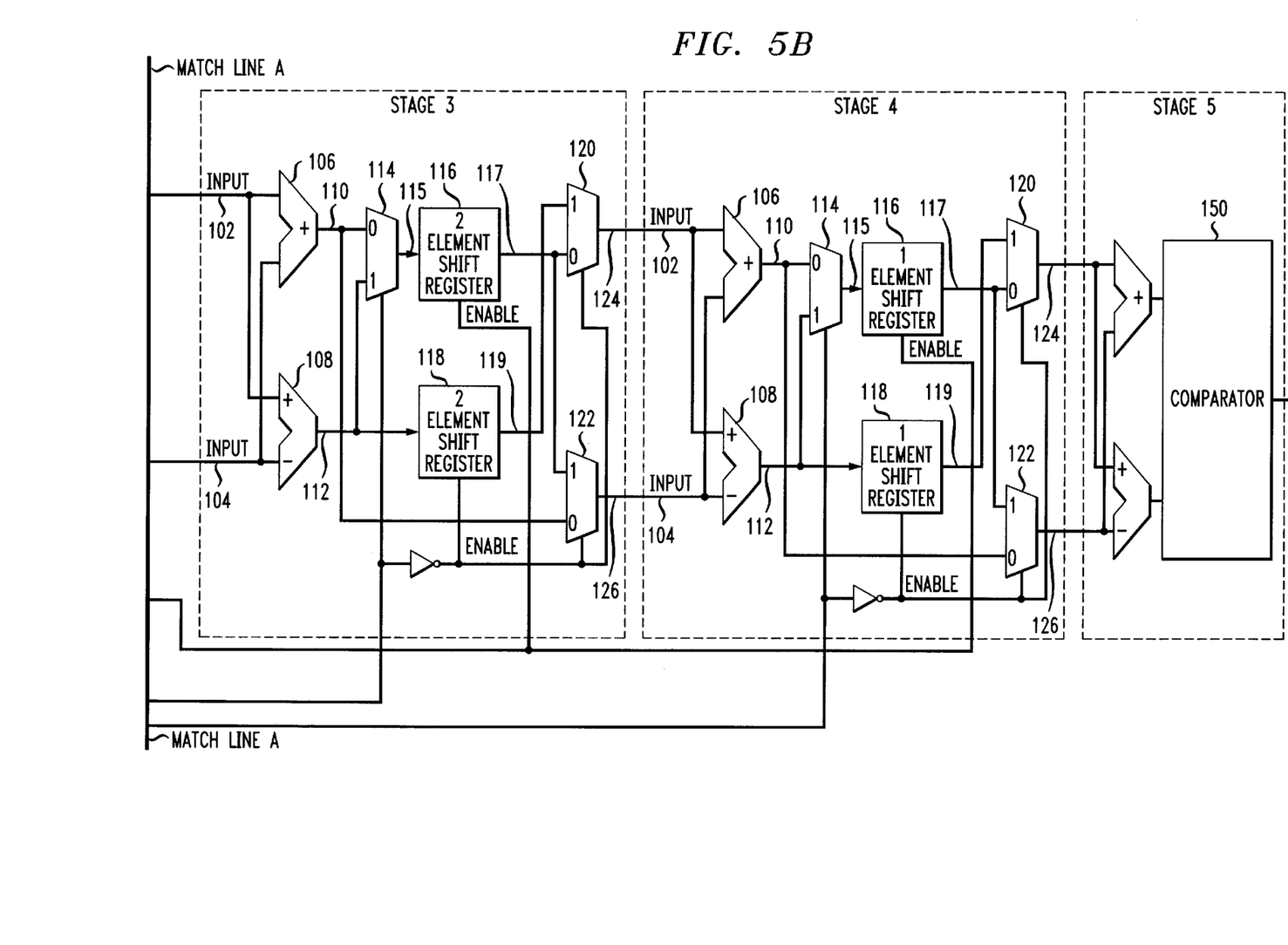
Figure 6A:
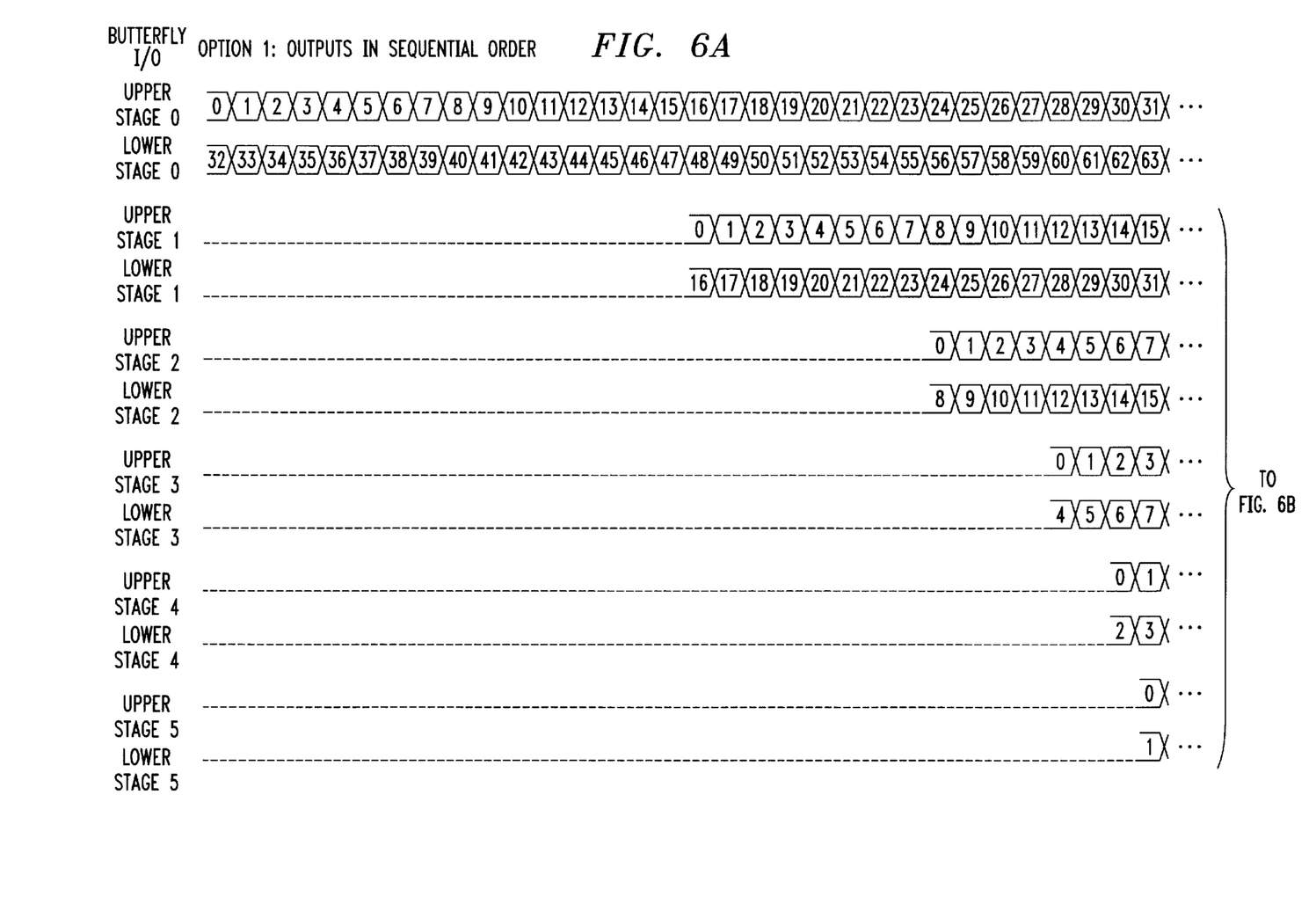
FIGS. 6A–B is a timing diagram which illustrates how, and when, input signals arrive at each stage of an FHT engine, in accordance with one embodiment of the present invention.
Figure 6B:
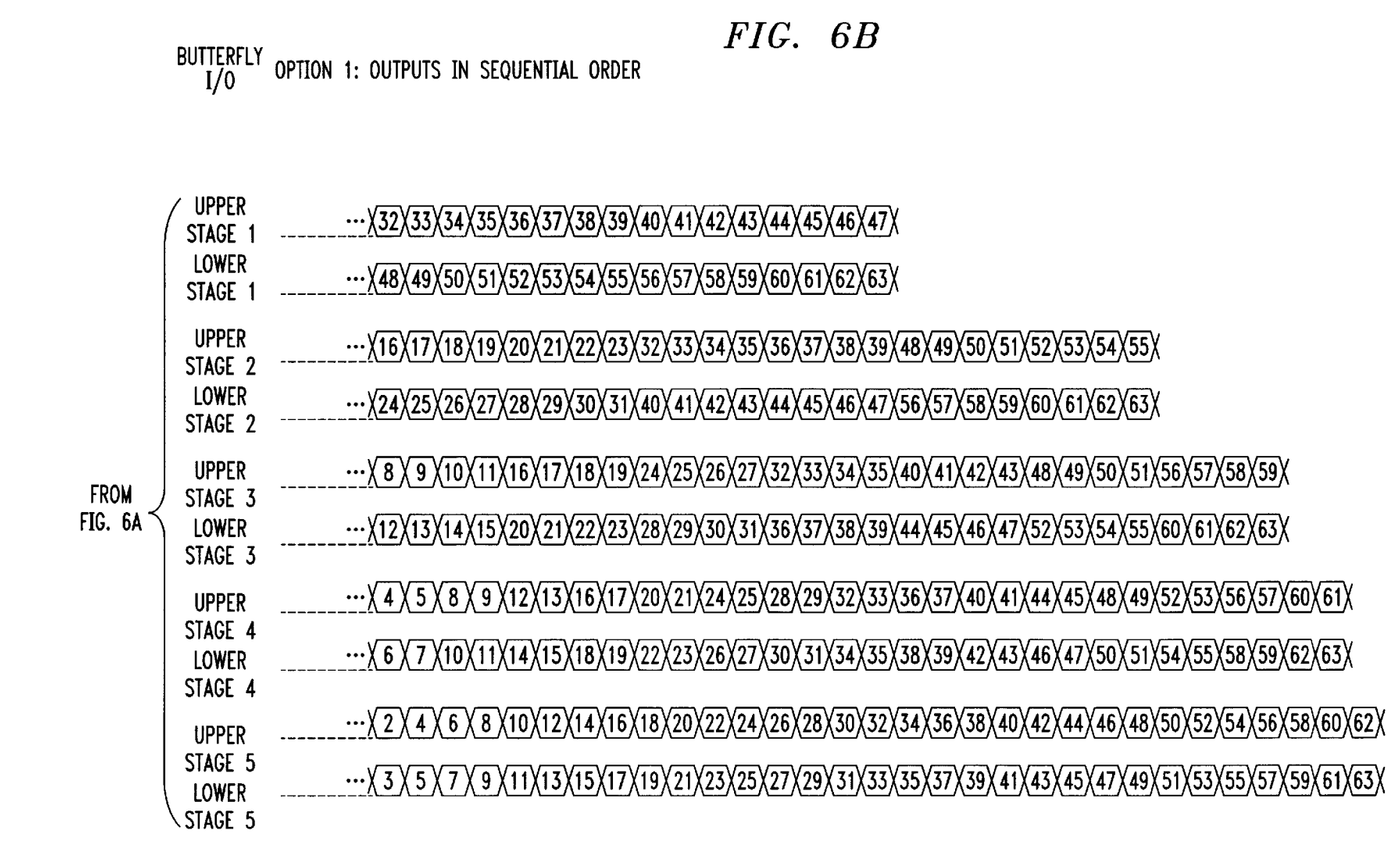

There are various ways in which Walsh chips can be inputted at the first stage of an FHT engine. FIGS. 6A–B is a timing diagram which illustrates, according to one embodiment of the invention, one possible order in which to input a Walsh codeword having 64 Walsh chips (configured as shown in FIGS. 5A–B), and the manner in which the FHT engine performs operations on the inputted signals. Additionally, the timing diagram shows the number of clock cycles required to generate 64 final correlation coefficients. According to this embodiment, during the first clock cycle, designated as clock cycle 0, the first Walsh chip, designated by Walsh chip index "0", is inputted to upper input terminal 102 in Stage 0 and a Walsh chip, designated by Walsh chip index "32", is inputted to lower input terminal 104 in Stage 0. In the next clock cycle, Walsh chips "1" and "33" arrive at upper and lower input terminals 102 and 104, then "2" and "34", "3" and "35", etc.

FIGS. 5A–B is an FHT engine which corresponds, in accordance with one embodiment of the invention, to the timing diagram of FIGS. 6A–B. FIGS. 5A–B shows the input and output signals corresponding to the Walsh chips "0" through "63" as processed through the cascading stages of the FHT engine. For instance, in Stage 0 of the engine, input signals corresponding to Walsh chips "0" through "31" arrive at upper input terminal 102, while input signals corresponding to Walsh chips "32" through "63" arrive at lower input terminal 104. As described above in regards to the timing diagram of FIG. 6, the input signals corresponding to Walsh chips "0" and "32" are the first to be summed by adder 106 and subtracted by subtractor 108.

As shown in both FIGS. 5 and 6, during clock cycles 0 through 15, input terminal "0" of multiplexer 114 is selected, as controlled by output terminal $Q_4$ of clock means 128, so as to generate output signals 115 corresponding to the summations of the first sixteen Walsh chip pairs, identified as coefficients "0" through "15". During these same clock cycles, shift register 116 is enabled so as to accept output signals 115 generated by multiplexer 114, also identified as coefficients "0" through "15". Shift register 118 is also enabled so as to accept output signals 112, corresponding to the difference of the first sixteen Walsh chip pairs, identified as coefficients "32" through "47". Thus, at the end of sixteen cycles, register 116 stores the result of the first summation, and register 118 stores the results of the subtraction of the first sixteen Walsh chip pairs.

At this point, clock signal $Q_4$ goes low, so that shift register 118 is disabled, input terminals "0" of multiplexers 120 and 122 are selected, and input terminal "1" of multiplexer 114 is selected. As a result, during clock cycles 16 through 31, multiplexer 114 generates output signals 115, identified as coefficients "48" through "63", corresponding to the difference of the next sixteen Walsh chip pairs as received at subtractor 108. Shift register 116 remains enabled by FHT Enable signal 127 so as to accept the output signals corresponding to coefficients "48" through "63", as generated by multiplexer 114. Meanwhile, shift register 116 sequentially outputs signals corresponding to coefficients "0" through "15", which it received during clock cycles 0 through 15. These output signals are sent to multiplexer 120, which is enabled so as to generate output signals 124, corresponding to the signals it receives at input terminal "0". Thus, during clock cycles 16 through 31, input signals corresponding to coefficients "0" through "15" arrive at upper input terminal 102 of Stage 1.

During clock cycles 0 through 15, shift register 118 is disabled so as not to accept any signals, and instead stores the signals corresponding to coefficients "32" through "47" which it previously received during clock cycles 0 through 15. Additionally, during clock cycles 16 through 31, input terminal "0" of multiplexer 122 is selected so as to generate output signal 126 corresponding to the signal it receives at input terminal "0". Thus, input signals corresponding to coefficients "16" through "31" arrive at lower input terminal 104 of Stage 1.

During clock cycles 32 through 47, shift register 116 remains enabled, as controlled by FHT Enable signal 127, so as to store output signals corresponding to coefficients "48" through "63", which it received during clock cycles 16 through 31. These output signals are sent to multiplexer 122, which is configured to select signals provided to input terminal "1". Thus, input signals corresponding to coefficients "48" through "63" arrive at lower input terminal 104 of Stage 1. Shift register 118 is enabled again, as controlled by output terminal $Q_4$ of clock means 128, so as to generate output signals corresponding to the coefficients "32" through "47", which it stored previously. Additionally, during clock cycles 32 through 47, multiplexer 122 is enabled so as to generate an output signal corresponding to the signal it receives at input terminal "1". Thus, input signals corresponding to coefficients "32" through "47" arrive at upper input terminal 102 of Stage 1.

As shown, each subsequent stage receives input signals from the stage preceding it in a number of clock cycles which is one half the number of clock cycles which the preceding stage received its input signals. This is accomplished, as discussed previously, by progressively decreasing the memory storage capacity of the shift registers in each subsequent stage by a factor of two. As previously mentioned, in accordance with one embodiment of the invention, clock means 128 operates to switch the input signals of the multiplexers, and to enable and disable shift register 118, twice as often in each subsequent stage as it does in a preceding stage. For instance, in the above example, if clock means 128 reversed operation of the multiplexers and shift register 118 every 16 clock cycles in Stage 0, then it would reverse the operation every 8 clock cycles in Stage 1, every 4 clock cycles in Stage 2, etc.

In comparison to the prior art, the FHT engine of the present invention requires a smaller amount of memory space to store signals while performing the sum and difference operations required by the FHT algorithm. For example, during clock cycle 16, both Stage 0 and Stage 1 are receiving, and hence performing the sum and difference operations of the FHT algorithm on, input signals corresponding to coefficient "16", obviating the need to store the input signal, or any resulting output signals, twice. During clock cycle 17, the same benefit is experienced with regards to the upper input signal of Stage 0 and the lower input signal of Stage 1. In this case, both stages receive input signals corresponding to coefficient "17", and thus do not need to store the input signals, or the resulting output signals, twice.

The benefit is repeated in each successive clock cycle between any two adjacent stages. For instance, during clock cycle 29, an input signal corresponding to the Walsh chip "29" arrives at upper input terminal 102 of Stage 0 and an input signal corresponding to coefficient "29" arrives at lower input terminal 104 of Stage 1; input signals corresponding to coefficients "13" arrive at upper input terminal 102 of Stage 1 and at lower input terminal 104 of Stage 2, and input signals corresponding to coefficients "5" arrive at upper input terminal 102 of Stage 2 and at lower input terminal 104 of Stage 3.

As can be seen in FIG. 6, this embodiment of the present invention requires 63 clock cycles to generate all 64 correlation coefficients. As previously discussed, the output signals generated by multiplexers 120 and 122 of Stage 4, which are also shown as the input signals received by upper and lower inputs 102 and 104 of Stage 5, are final correlation coefficients, each of which corresponds to a legitimate Walsh codeword. Advantageously, in this embodiment, the output signals which are generated in the final stage of the FHT engine are in sequential order.

In one embodiment, after all of the 64 correlation coefficients have been generated, the largest coefficient is selected and the legitimate Walsh codeword which corresponds to the selected coefficient is determined to be the originally sent Walsh codeword. In another embodiment, as each two final correlation coefficients are generated in Stage 5, comparator 150, as illustrated in FIG. 5, determines which is the larger of the two, and stores the larger coefficient for comparison with the two final correlation coefficients which will be generated in the next clock cycle. This process is repeated until all of the final correlation coefficients have been generated and compared, and the largest selected. In either embodiment, the 64-chip block or Walsh codeword which was received by receiver 18, is corrected if the codeword was corrupted during transmission by noise, interference or distortion.

Figure 7A:
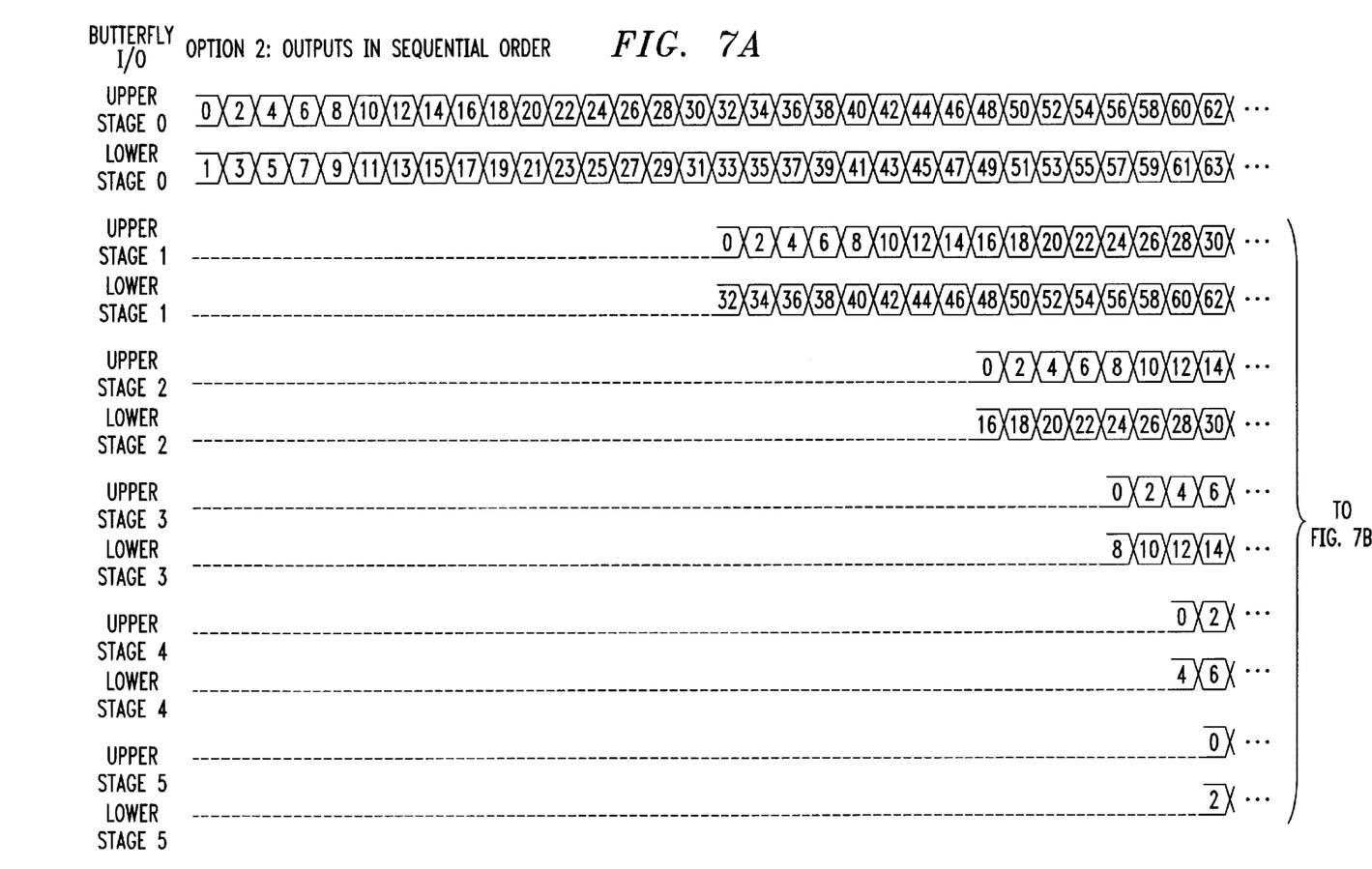
FIGS. 7A–B is a timing diagram which illustrates how and when input signals arrive at each stage of an FHT engine, in accordance with another embodiment of the present invention.
Figure 7B:
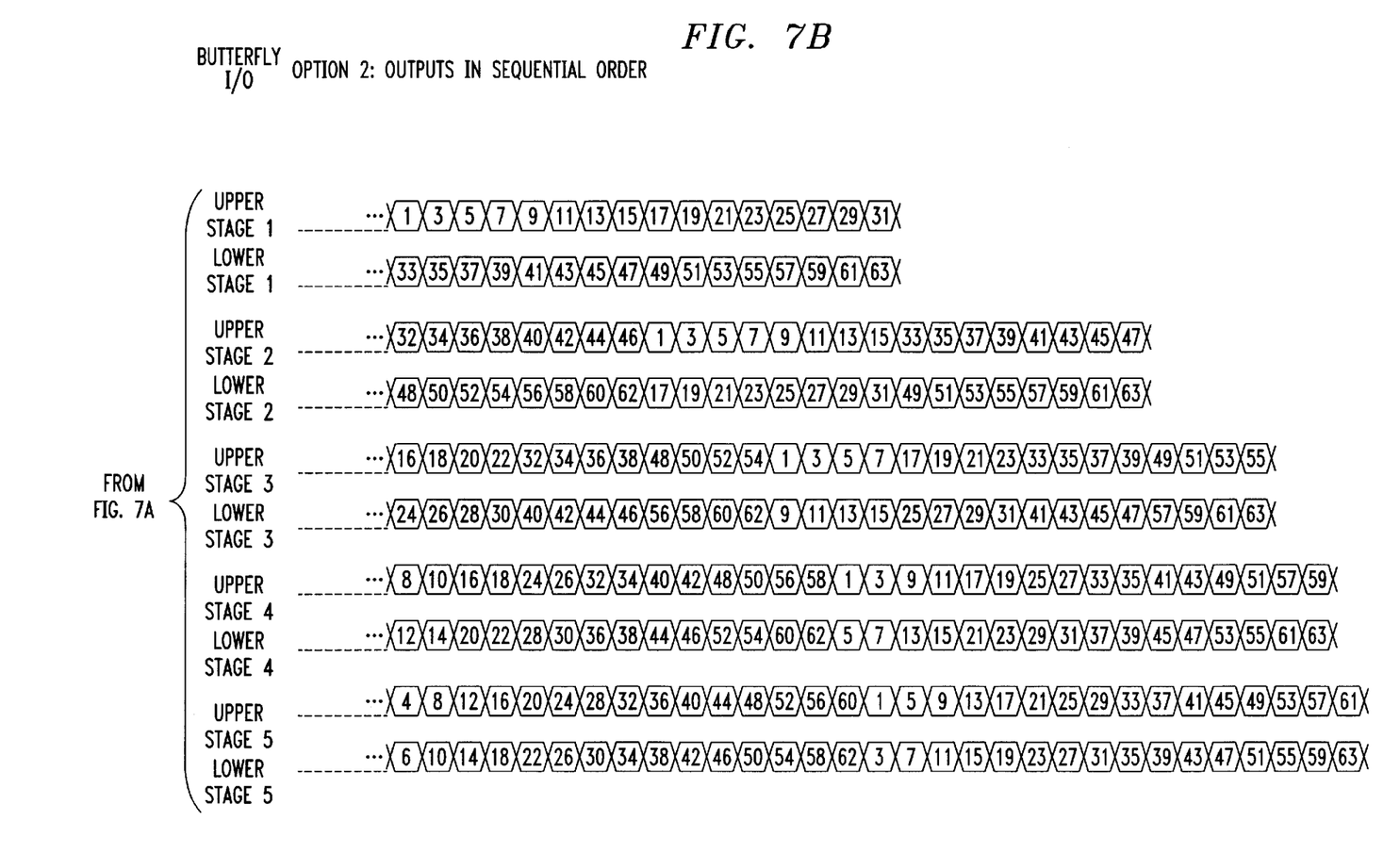

Another way in which the Walsh chips can be inputted at the first stage of an FHT engine is shown in FIGS. 7A–B, which illustrates another timing diagram. In this embodiment, the input signals which arrive at upper input 102 and lower input 104 of Stage 0 are in sequential order, such that, during the first clock cycle, Walsh chips "0" and "1" arrive at upper and lower inputs 102 and 104, respectively. In the next clock cycle, Walsh chips "2" and "3" arrive at upper and lower inputs 102 and 104, then "4" and "5", "6" and "7", etc. One advantage of this embodiment is that it is not necessary to maintain a set of Walsh chips in a memory space prior to their arrival at upper and lower inputs 102 and 104—incoming chips can be immediately fed into the FHT engine. However, as can be seen in Upper Stage 5 and Lower Stage 5 of FIG. 7, the final output signals emerge from outputs 124 and 126 in non-sequential order.

It should be noted that, in accordance with one embodiment, the FHT apparatus of the present invention employs additional decoders for detecting and correcting transmission errors based upon the output of the FHT engine.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

I claim:

1. A Fast Hadamard Transform apparatus having a plurality of transform stages, employed by a wireless telecommunication system for detecting and correcting errors that occur during the transmission of coded signal blocks having N bits, each stage of said apparatus comprising:

an adder having an output terminal and a subtractor having an output terminal, said adder and said subtractor configured to receive N/2 signal pairs within each received signal block, so as to generate intermediate coefficients;

a first memory unit coupled to the output terminal of said adder and the output terminal of said subtractor, said memory unit configured to receive a first specifiable sequence of said intermediate coefficients from said adder and a second specifiable sequence of said intermediate coefficients from said subtractor;

a second memory unit coupled to the output terminal of said subtractor so as to receive a third specifiable sequence of said intermediate coefficients from said subtractor, such that said first memory unit and said adder provide concurrently a plurality of intermediate coefficient signal pairs to a subsequent transform stage, and said first and second memory units provide concurrently a plurality of other intermediate coefficient signal pairs to said subsequent transform stage.

2. The apparatus according to claim 1, further comprising a first multiplexer, coupled to said output terminals of said adder and subtractor and to said first memory unit, said first multiplexer configured to select one of said first and second specifiable sequences to be received by said first memory unit.

3. The apparatus according to claim 1, further comprising a second multiplexer, coupled to said output terminals of said adder and first memory unit, said second multiplexer configured to select a specifiable sequence of intermediate coefficients to be provided to said subsequent transform stage, said apparatus further comprising a third multiplexer, coupled to said output terminals of said first and second memory units, said third multiplexer configured to select a specifiable sequence of intermediate coefficients to be provided to said subsequent transform stage.

4. The apparatus according to claim 1, further comprising a clock means for causing successive pairs of input signals to be received by said FHT apparatus.

5. The apparatus according to claim 4, wherein said clock means is a counter having a plurality of bits, each of said plurality of bits corresponding to a signal received by a transform stage of said FHT apparatus.

6. The apparatus according to claim 5, wherein said counter signal received by each said transform stage alternately enables and disables said second memory unit, and determines which of said first or second specifiable sequence of intermediate coefficients is received by said first memory unit.

7. The apparatus according to claim 1, further comprising a comparator coupled to a final transform stage, said comparator configured to consecutively receive and store a larger signal of each said concurrently provided intermediate coefficient signal pair.

8. The apparatus according to claim 1, wherein, in a final transform stage, each signal of said plurality of intermediate coefficient signal pairs and said plurality of other intermediate coefficient signal pairs corresponds to one of N legitimate coded signal blocks.

9. The apparatus according to claim 8, wherein said counter signal having the largest value corresponds to a coded signal block that was transmitted by said wireless system.

10. The apparatus according to claim 1, wherein said coded signal block is a Walsh codeword.

11. A method for demodulating N-bit signal blocks received by a communications receiver employing a Fast Hadamard Transform arrangement having a plurality of transform stages, for each stage said method comprising the steps of:
  adding and subtracting N/2 signal pairs within each received signal block, so as to generate intermediate coefficients;
  storing in a first memory unit a first specifiable sequence of said intermediate coefficients from said adding step and a second specifiable sequence of said intermediate coefficients from said subtracting step;
  storing in a second memory unit a third specifiable sequence of said intermediate coefficients from said subtractor;
  providing concurrently a plurality of intermediate coefficient signal pairs from said first memory unit and from said adding step to a subsequent transform stage, and providing concurrently a plurality of other intermediate coefficient signal pairs from said first and second memory units to said subsequent transform stage.

12. The method according to claim 11, further comprising the step of generating a plurality of clock counter signals, each of said clock counter signals corresponding to one of said subsequent transform stages.

13. The method according to claim 12, further comprising the steps of alternately enabling and disabling said first second memory unit with said generated clock counter signal, and determining which of said first or second specifiable sequences of intermediate coefficient signal pairs is received by said first memory unit.

14. The method according to claim 13, further comprising the step of alternating between providing concurrently a plurality of intermediate coefficient signal pairs from said first memory unit and from said adding step to a subsequent transform stage, and providing concurrently a plurality of other intermediate coefficient signal pairs from said first and second memory units to said subsequent transform stage.

15. The method according to claim 11, further comprising the step of, after a final transform stage, comparing said concurrently provided intermediate coefficient signal pair and storing the larger of said signals.

16. In a Fast Hadamard Transform apparatus having a plurality of transform stages, employed by a wireless telecommunication system for detecting and correcting errors that occur during the transmission of coded signal blocks having N bits, a stage of said apparatus comprising:
  an adder having an output terminal and a subtractor having an output terminal, said adder and said subtractor configured to receive N/2 signal pairs within each received signal block, so as to generate intermediate coefficients;
  a first memory unit coupled to the output terminal of said adder and the output terminal of said subtractor, said memory unit configured to receive a first specifiable sequence of said intermediate coefficients from said adder and a second specifiable sequence of said intermediate coefficients from said subtractor;
  a second memory unit coupled to the output terminal of said subtractor so as to receive a third specifiable sequence of said intermediate coefficients from said subtractor, such that said first memory unit and said adder provide concurrently a plurality of intermediate coefficient signal pairs to a subsequent transform stage, and said first and second memory units provide concurrently a plurality of other intermediate coefficient signal pairs to said subsequent transform stage.

17. The Fast Hadamard Transform stage according to claim 16, further comprising a first multiplexer, coupled to said output terminals of said adder and subtractor and to said first memory unit, said first multiplexer configured to select one of said first and second specifiable sequences to be received by said first memory unit.

18. The Fast Hadamard Transform stage according to claim 16, further comprising a second multiplexer, coupled to said output terminals of said adder and first memory unit, said second multiplexer configured to select a specifiable sequence of intermediate coefficients to be provided to said subsequent transform stage, and further comprising a third multiplexer, coupled to said output terminals of said first and second memory units, said third multiplexer configured to select a specifiable sequence of intermediate coefficients to be provided to said subsequent transform stage.

19. The Fast Hadamard Transform stage according to claim 16, further comprising a clock means for causing successive pairs of input signals to be received by said FHT apparatus.

20. The Fast Hadamard Transform stage according to claim 19, wherein said clock means is a counter having a plurality of bits, each of said plurality of bits corresponding to a signal received by a transform stage of said FHT apparatus.

21. The Fast Hadamard Transform stage according to claim 20, wherein said counter signal received by each said transform stage alternately enables and disables said second memory unit, and determines which of said first or second specifiable sequence of intermediate coefficients is received by said first memory unit.

22. The Fast Hadamard Transform stage according to claim 16, wherein, in a final transform stage, each signal of said plurality of intermediate coefficient signal pairs and said plurality of other intermediate coefficient signal pairs corresponds to one of N legitimate coded signal blocks.

23. The Fast Hadamard Transform stage according to claim 22, wherein said counter signal having the largest value corresponds to a coded signal block that was transmitted by said wireless system.

24. The Fast Hadamard Transform stage according to claim 16, wherein said coded signal block is a Walsh codeword.

* * * * *